UNITED STATES PATENT OFFICE 2,073,011

PERACETYLATED OIL

Leo P. Hubbuch, Wilmington, Del., assignor to E. I. du Pont de Nemours & Company, Wilmington, Del., a corporation of Delaware No Drawing. Application August 23, 1934, Serial No. 741,045

3 Claims. (Cl. 87—12)

This invention relates to the modification of unsaturated glycerides and more particularly to the modification of such glycerides by treatment with an organic peracid, and still more particularly to modifications of glycerides whose iodine numbers are between the limits of 10 and 85, which modifications are obtained by treatment of such glycerides with solutions of hydrogen peroxide in organic acids, particularly glacial acetic acid.

Castor oil has been treated with a small amount of peracetic acid in order to convert the trilinolein contained therein into compounds having a lessened tendency toward rancidity. The peracetylation removes only about 10% of the unsaturation.

This invention has as an object the provision of new modified glycerides wherein a substantial amount of the unsaturation is removed by peracetylation. A further object is the preparation of oils more compatible, than the original oil, with nitrocellulose and other cellulose derivatives. A still further object is the preparation of new coating compositions. A further object is the preparation of new decorative coated fabrics. Other objects will appear hereinafter.

These objects are accomplished by the following invention wherein an unsaturated oil having an iodine number of 10 to 85 is treated with an organic peracid to reduce the unsaturation at least 60%, the resulting peracetylated oil being employed in compositions with cellulose derivatives particularly useful in the coating of fabric and fibrous bases.

Modifications of the above kind markedly improve the properties of the glycerides as softeners in cellulose derivative compositions, particularly those for use as coating or impregnating compositions for wood, cloth, paper, and the like. In order that these compositions shall retain their initial properties on aging, it is necessary that the softening agent should be almost saturated to prevent its oxidation and the detrimental effect of this oxidation on the remainder of the cellulose derivative composition. Most of the readily available saturated glycerides (with the exception of those of the coconut oil type and those of lower molecular weight) and unsaturated glycerides (with the exception of those of the castor oil type) are not compatible with nitrocellulose. The low molecular weight saturated glycerides have offensive odors, those of the coconut oil range tend to "bloom" from or form a white, greasy film on the surface of the nitrocellulose composition, and those of high molecular weight are incompatible. Unsaturated glycerides of the castor oil type, i. e., hydroxylated oils, are compatible with nitrocellulose but peculiarly subject to oxidative changes and the development of rancidity. Other unsaturated glycerides are not compatible with nitrocellulose. By means of the technique of the present invention, the glycerides of iodine numbers from about 10 to about 85 are changed into substantially saturated glycerides which are compatible with nitrocellulose.

In order to explain more clearly the process of the present invention, the following theory is given:

When a 30% solution of hydrogen peroxide in water is mixed with glacial acetic acid an equilibrium is established between the hydrogen peroxide, water, glacial acetic acid and peracetic acid, as shown in the following equation:

$$CH_3COOH + H_2O_2 \rightleftharpoons CH_3COO \cdot OH + H_2O$$

When this mixture is refluxed with an unsaturated ethylene compound an addition of the peracetic acid to the double bonds probably occurs, as illustrated in the following equation in which R may represent an alkyl group such as a tetradecyl and R' may represent a glyceryl radical:

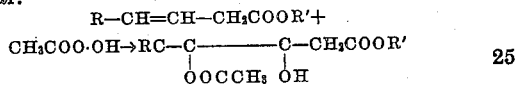

The object of the process of the present invention is the treatment of glyceryl esters of unsaturated fatty acids in such a way as to add one ester group and one hydroxyl group to the major portion of the ethylenic linkages. Of course during such addition, some esterification of the hydroxyl groups may occur to form glyceryl esters containing two ester groups on each hitherto unsaturated linkage instead of one ester group and one hydroxyl group, both types coming within the scope of the present invention. These ester and hydroxyl groups increase the compatibility of the oil with nitrocellulose, and the removal of unsaturation decreases the tendency to oxidation and deterioration of the oil and the consequent deterioration of the nitrocellulose composition and products made therefrom such as artificial leather.

Having outlined above the general purposes and principles of the invention, the following applications thereof to certain specific instances are included for purposes of illustration and not in limitation.

*Example 1*

| Constituent | Parts |
|---|---|
| Castor oil | 1.00 |
| Glacial acetic acid | 7.00 |
| Hydrogen peroxide (30% in water) | 2.00 |

The castor oil, glacial acetic acid and hydrogen peroxide were mixed and allowed to stand in a well stoppered flask at room temperature for two days. The mixture was shaken at intervals. The oily layer which was at first apparent gradually disappeared and the mixture of constituents became homogeneous. The homogeneous solution was dissolved in 500 cc. of toluol and washed free of acetic acid. The toluol solution of the peracetylated oil was heated at 150° C. and blown with $CO_2$ until no more toluol was present as judged by odor. The product so obtained was a light brown, viscous oil of iodine number=14.06 and acetyl value=252.9. The iodine number and acetyl value of the original castor oil were respectively 84.0 and 134.5. On the basis of iodine number drop, approximately 83.3% peracetylation was secured.

In place of castor oil other unsaturated glycerides of iodine numbers of between 10 and 85 may be used. The following example illustrates the application of the process of the invention to olive oil:

Example 2

| Constituent | Parts |
|---|---|
| Olive oil | 1.67 |
| Glacial acetic acid | 8.34 |
| Hydrogen peroxide (30% in water) | 1.00 |

The olive oil, glacial acetic acid and hydrogen peroxide were mixed in a flask and heated carefully, with gentle stirring, to 100° C. The flask was loosely stoppered and allowed to stand overnight. The acetic acid was distilled off by heating at 200° C. and blowing with $CO_2$. The length of time of heating varies depending upon the size of the charge. After no more acetic acid distilled over, the charge was heated at 200° C. in an open vessel and blown with $CO_2$ for ½ hour to remove the last traces of acetic acid. The product after being cooled was a viscous, yellow liquid of an acid number of 5.2 and an iodine number of 11.3. The iodine number of the original olive oil was 86.0. On the basis of iodine number drop, approximately 86.9% peracetylation was secured.

The process of the invention is applicable not only to glycerides of high iodine number but also to those of low iodine number. The following example illustrates the application of the process of the invention to coconut oil:

Example 3

| Constituent | Parts |
|---|---|
| Coconut oil | 4.00 |
| Glacial acetic acid | 8.00 |
| Hydrogen peroxide (30% in water) | 1.00 |

The coconut oil, glacial acetic acid and hydrogen peroxide were mixed in a loosely stoppered flask and allowed to stand for 3 days. The mixture was shaken at intervals. The oily layer did not disappear. The acetic acid was then distilled off by heating at 170° C. and blowing with $CO_2$ until no more acetic acid distilled over. The last traces of acid were removed by transferring the charge to an open beaker and heating at 170° C. and blowing with $CO_2$ until no further odor of acetic acid was noticeable (1 hr. about). The product after being cooled was a light yellow, thin oil of an iodine number of 2.7 and an acetyl value of 25.3. The iodine number and acetyl values of the original coconut oil were respectively 12.0 and 1.0. On the basis of iodine number drop, approximately 77.5% peracetylation was secured.

The above examples indicated the process for the preparation of various peracetylated oils. These are useful as improved softeners in decorative and protective compositions for fibrous or woven flexible bases. The following examples are illustrative of the usefulness of these new products in coating compositions:

Example 4

| | Parts by wt. |
|---|---|
| Softener of Example 3 | 18.4 |
| Cellulose nitrate of approximately 12.3–12.6 nitrogen content | 11.8 |
| Lithopone pigment | 13.6 |
| Ethyl acetate | 22.4 |
| Ethyl alcohol | 33.8 |

This composition, when spread on cloth and suitably dried, gave an artificial leather superior to those with the present castor oil softener. This superiority lay in improved aging characteristics of the coating and in the freedom from the tendency of the softener to bloom.

Example 5

| | Parts by wt. |
|---|---|
| Softener of Example 1 | 20.8 |
| Cellulose nitrate of approximately 12.3–12.6 nitrogen content | 11.3 |
| Lithopone pigment | 14.4 |
| Ethyl acetate | 21.4 |
| Ethyl alcohol | 32.1 |

The superiority of this composition when spread on cloth and dried lay in improved aging characteristics and a higher temperature of exudation than castor oil, the softener now regularly used.

In the foregoing description, castor oil, coconut oil, and olive oil have been given as examples of oils to which the process of the present invention implies, and peracetic acid has been used as an example of peracid. Other unsaturated glycerides may be employed such as linseed oil, China-wood oil, almond oil, cottonseed oil, neatsfoot oil, palm oil, sperm oil, as well as specially prepared unsaturated mixed glycerides. Other peracids such as perpropionic, perisobutyric, perbenzoic, perphthalic, etc., acids may be employed. The proportions of peracid to unsaturated glyceride may vary but should not be less than such as to reduce the iodine number of the unsaturated glyceride at least 60%. Below 60% reduction in unsaturation, as evidenced by iodine number, the peracetylated products do not show the very great advantages over the untreated oils which are obtained above 60%. The peracids may be prepared in a number of ways such as by dissolving hydrogen peroxide in the acid or the anhydride or the acid chloride either with or without the addition of a catalyst such as sulfuric acid, hydrochloric acid, etc. In place of hydrogen peroxide, which is very explosive, a 30% solution in water is preferred. Different proportions of acid or acid anhydride can be used in the preparation of the peracids, altho the best results were obtained when a solution containing 3.2% hydrogen peroxide, 7.5% water, and 89.3% glacial acetic acid by weight was used. In certain cases the peracid may be prepared in acetone, chloroform or other solvent and the oil treated with such a solution. In general, the best method for bringing about a reaction between the unsaturated glyceride and the solution of the peracid is to heat the mixture to boiling, then allow to cool and stand for several days. Other methods such as refluxing the constituents, allowing the constituents to stand for a number of days without heating, etc., may be employed.

The chief use for the products is as a softener in cellulose derivative compositions of nitrocellulose or ethyl cellulose, in particular for the manufacture of decorative and protective coating compositions for fibrous or woven flexible bases. They may also be employed with natural resins, synthetic resins, with bitumens, with other pasticizers, softeners, pigments, fillers, etc., for use in molding as adhesives or binders, as impregnating, toughening, and waterproofing agents for paper, wood, textiles, stone, etc. These new compositions of matter find application in cases where a softening agent is desired which combines the features of good stability on aging, good compatibility, no tendency to bloom and some toughening action.

These new and useful products obtained by peracetylating unsaturated glycerides to an extent of at least 60% based on the reduction of iodine number, are less susceptible to oxidative changes because of their low degree of unsaturation and are more compatible with nitrocellulose, ethyl cellulose, etc.

The superiority of these new softeners is best illustrated by the following table which gives actual results on cellulose nitrate films containing one part of cellulose nitrate of approximately 12.3 to 12.6% nitrogen content and one part by weight of softener.

| Softener | *Exudation Temp. °C. | **Percent deterioration | ***Bloom |
| --- | --- | --- | --- |
| Castor oil | 85 | 47.2 | None |
| Peracetylated castor oil | 110 | 6.5 | None |
| Coconut oil | 75 | 24.8 | Definite |
| Peracetylated coconut oil | 75 | 8.2 | None |
| Olive oil | 25 | High | Incompatible |
| Peracetylated olive oil | 75 | 15.6 | None |

*The exudation temperature is the temperature at which the softening component comes out on the surface of the film in the form of oil drops.
**The percentage deterioration represents the decrease in percentage elongation resulting from exposure of the film to a temperature of 65° C. for six weeks. Development of brittleness in a film invariably is accompanied by a decrease in the percentage elongation of the film.
***By "bloom" is meant the appearance of a white, greasy film on the surface of the composition.

As can be seen from the table, the new softeners are superior to the unsaturated or partly unsaturated oils from which they are derived in that (1) their exudation temperatures are higher; (2) they cause less deterioration of the composition on aging; and (3) they are more compatible as shown by the freedom from tendency to bloom in certain cases.

The above description and examples are intended to be illustrative only. Any modification of or variation therefrom which conforms to the spirit of the invention is intended to be included within the scope of the claims.

I claim:

1. Process for the preparation of modified glycerides, which comprises heating to 100° C. a mixture of 1.67 parts by weight of olive oil, 8.37 parts by weight of glacial acetic acid, and 1 part by weight of a 30% solution of hydrogen peroxide in water, allowing the mixture to cool and to stand for 24 hours at room temperature, then distilling off the acetic acid by heating at 200° C., and blowing with carbon dioxide.

2. Process for the preparation of modified glycerides, which comprises heating to 100° C. a mixture of olive oil and sufficient peracetic acid to reduce the unsaturation of the olive oil at least 60%, allowing the mixture to cool and to stand for 24 hours at room temperature, then distilling off the acetic acid by heating at 200° C., and blowing with carbon dioxide.

3. Process for the preparation of modified glycerides which comprises heating to 100° C. a mixture of olive oil and peracetic acid, the peracetic acid being present in amount sufficient to reduce the unsaturation of the olive oil at least 60%, allowing the mixture to cool and to stand for 24 hours at room temperature, then distilling off the acetic acid by heating at 200° C., and blowing with carbon dioxide.

LEO P. HUBBUCH.